Aug. 2, 1938.   J. MELUZIN   2,125,682
LATHE HAND GAUGE
Filed Sept. 2, 1937
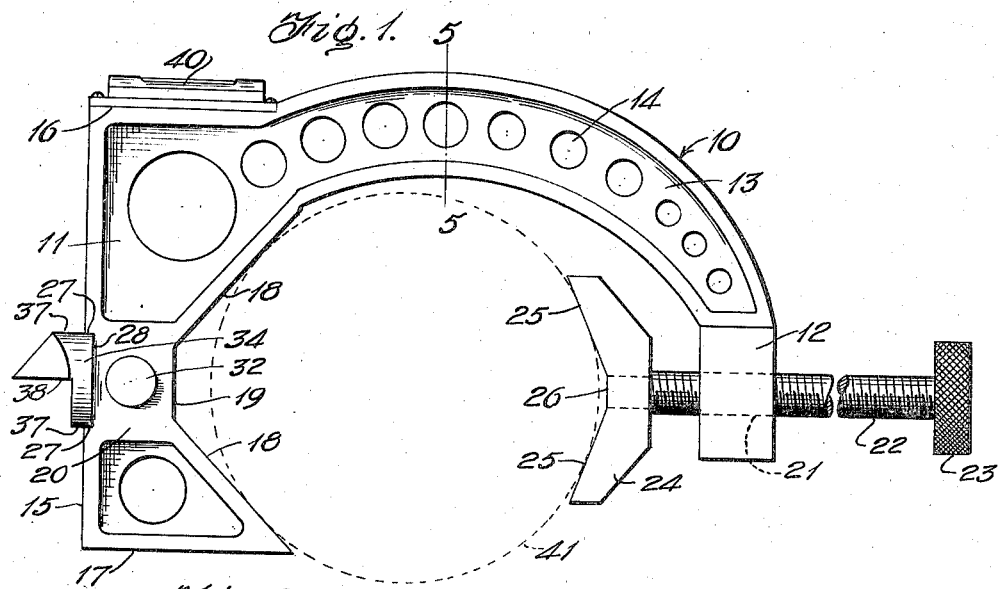
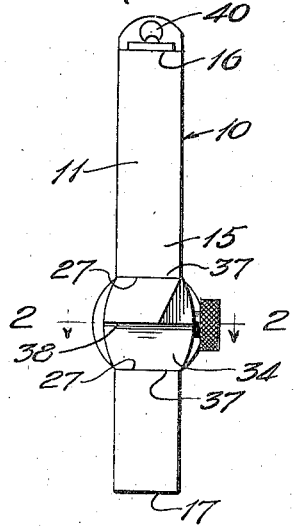
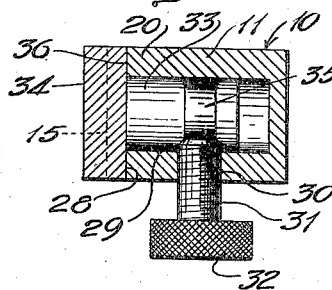
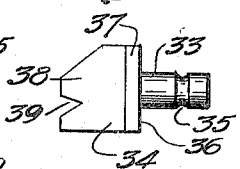
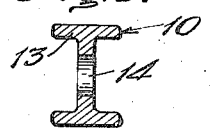
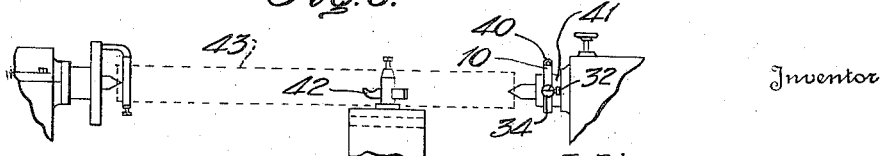
Inventor
Julius Meluzin,
By
Clarkson
Attorney Patented Aug. 2, 1938

2,125,682

UNITED STATES PATENT OFFICE 2,125,682

LATHE HAND GAUGE

Julius Meluzin, Washington, D. C.

Application September 2, 1937, Serial No. 162,209

2 Claims. (Cl. 33—185)

This invention relates to tool setting gauges and has special reference to a lathe hand gauge for setting a lathe tool accurately in proper position to effect the cutting of a work piece or blank mounted in a lathe for turning to desired size and shape.

One important object of the invention is to provide a novel gauge which may be readily and conveniently applied to the dead center spindle of any lathe wherein the diameter of the spindle is within the limits of gripping adjustment of the gauge.

A second important object of the invention is to provide a novel gauge for use on the dead center spindle of a lathe and which, when applied to such a spindle, may be readily set to bring a gauge surface into such position that a tool having its point set to engage or be flush with such surface will be in correct position for cutting the work.

A third important object of the invention is to provide a gauge of the foregoing character adjustable for use in setting both turning and boring lathe tools.

A fourth important object of the invention is to provide a novel gauge of this character having means whereby a thread cutting lathe tool may be accurately set to proper cutting position.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a side elevation of the novel gauge.

Figure 2 is a front edge view thereof.

Figure 3 is an enlarged detail section on the line 3—3 of Figure 2.

Figure 4 is a plan view of a gauge element adjustable to the gauge frame for use in setting a thread cutting lathe tool.

Figure 5 is a section on the line 5—5 of Figure 1.

Figure 6 is a fragmentary front elevation showing a portion of a lathe with the novel gauge in position thereon.

In the embodiment of the invention as here illustrated there is provided a frame 10 of substantially C-shape. This frame comprises a head or front portion 11, a rear portion 12 and an arcuate portion 13 connecting said front and rear portions. The major part of the frame is preferably of I-shape in cross-section to economize in weight without sacrificing the essential strength and rigidity. Also the web of the I-shaped portion of the frame is provided with weight relieving openings 14.

The head 11 is formed with a front face or edge 15 from which extend rearwardly the top face or edge 16 and the bottom face or edge 17. The faces 16 and 17 are at right angles to the face 15 and are consequently parallel. The rear edge of the head 11 is formed by a pair of flat forwardly converging faces 18 which merge at their forward ends into a short flat face 19 parallel to the face 15. The portion 20 of the head between the faces 15 and 19 is rectangular in cross-section so that it forms a species of boss for purposes presently to be explained.

The rear frame portion 12 is also of rectangular cross-section to form a boss opposed to the boss 20. Through this rear frame portion extends a threaded bore 21 having its axis aligned with the line at which the two plane faces would intersect if they were continued until they met.

Cooperating with the faces 18 is an adjustable clamp device comprising a screw 22 threaded into the bore 21 and rotatable by means of a knurled head 23 fixed on its rear end. A clamp head 24 is swivelled on the front end of the screw 22 and has its forward face formed by a pair of flat rearwardly converging faces 25 merging at their adjacent ends into a flat face 26. The faces 25 converge at equal angles to the axis of the screw 22 as do the faces 18.

In the face 15 is formed a shallow transverse groove having top and bottom edges 27 parallel to the face 17 and thus to each other. This groove also has a bottom face 28 parallel to the face 15. The edges 27 are disposed respectively above and below the axis of the screw 22 and at equal distances therefrom. A bore 29 extends rearwardly from the face 18 and is axially aligned with the screw 22 so that the faces 18 converge to a common point on the axis of the bore. Extending laterally from one side of the head 11 in axial intersecting relation with the bore 29 is a threaded bore 30 wherein is screwed a set screw 31 having a frusto-conical point and a knurled head 32.

A variety of gauge points may be provided for use in connection with the frame although but two such points are shown herein. All of the points to be used in this gauge have certain features in common. Thus each point has a shank 33 and a head 34. Each shank is of proper size to fit closely in the bore 29 and is provided with a groove 35 wherein closely fits the point of the screw 31 when the gauge point is positioned for use. Also the groove 35 is at such distance from the head 34 that the rear face 36 will fit against the groove bottom 28. The head 34 is provided with flat upper and lower faces 37 spaced to fit closely between the edges 27 upon the stem 33 being inserted in the bore or socket 29 and the head is provided with a flat horizontal gauge face 38 parallel to the face 17 and the axial line of the shank 33 lies in this face so that the planes of the faces 18 and 38 all meet at a common line of intersection. In the form of gauge point shown in Figure 4 the face 38 is provided with a V-shaped notch 39 to receive the usual bluntly V-shaped point of a lathe thread cutting tool when setting the latter.

On the face 16 is mounted a sensitive spirit level 40 so arranged that the bubble thereof will be in central position upon the face 17 being truly horizontal.

In use the appropriate gauge point is assembled in the frame, facing either up or down as may be desired. The gauge is then fitted on the dead center spindle 41 and the screw 22 rotated to clamp the spindle lightly between the faces 18 and 25. The gauge is now rotated on the spindle until, if the bed of the lathe be transversely horizontal, the bubble of the gauge is centered whereupon the screw 22 is tightened to fix the gauge in this position. The lathe carriage is now brought into such position that the tool 42 may have its point brought into contact with or flush with the point gauge face 38 which thus positions the tool so that its point will lie in the horizontal plane of the axis of the work piece or blank 43 and the tool will thus be in the most effective position for cutting the metal of the piece 43.

The gauge may be used to determine if the lathe bed is truly horizontal by resting the face 17 on the lathe bed to have the gauge extend transversely thereof. If not horizontal the bubble of the spirit level will move to a definite extent depending on the inclination of the bed from the horizontal. In setting the gauge the extent of deviation of the bubble must be observed and the same deviation obtained upon the gauge being clamped in the spindle. This is necessary since the point of the tool for the most effective cutting should lie in a plane defined in position by the axis of the lathe and the line of cross-feed of the tool.

If found convenient or desirable the gauge may be applied to the work itself rather than the dead center spindle.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a gauge for the purpose described, a substantially C-shaped frame including a pair of spaced terminal portions, one of said terminal portions constituting a head having a rear edge formed by a pair of flat forwardly converging faces, the other terminal portion having a screw threaded axially aligned opening bisecting the angle between said faces, an adjustable clamping device comprising a screw threaded into said opening and having a clamp head swivelled on its front end, said head having an opening therein aligned with the threaded opening, a gauge point having a shank fitting revolubly in the opening in said head and having a head provided with a plane gauge face positioned diametrically of the shank, and a set screw extending laterally in said head and engaging said shank to hold the gauge point with its gauge face in adjusted position.

2. In a gauge for the purpose described, a substantially C-shaped frame including a pair of spaced terminal portions, one of said terminal portions constituting a head having a rear edge formed by a pair of flat forwardly converging faces, the other terminal portion having a screw threaded axially aligned opening bisecting the angle between said faces, an adjustable clamping device comprising a screw threaded into said opening and having a clamp head swivelled on its front end, said head having an opening therein aligned with the threaded opening, a gauge point having a shank fitting revolubly in the opening in said head and having a head provided with a plane gauge face positioned diametrically of the shank, and a set screw extending laterally in said head and engaging said shank to hold the gauge point with its gauge face in adjusted position, said shank having a circumferential groove and the set screw having a point fittting in said groove whereby the set screw may be partially unscrewed for rotation of the gauge point while holding the shank from withdrawal from the opening in the head.

JULIUS MELUZIN.